United States Patent
Liu

(10) Patent No.: US 11,712,053 B2
(45) Date of Patent: Aug. 1, 2023

(54) METHOD FOR PREPARING AN ANTIMICROBIAL COMPLEX STRAIN FROM KEFIR

(71) Applicants: Amy Li, Katy, TX (US); Li Wang, Houston, TX (US); Youlian Zhao, Foshan (CN); Yuan Li, Zhuzhou (CN)

(72) Inventor: Jielong Liu, Doveton (AU)

(73) Assignees: Amy Li, Katy, TX (US); Li Wang, Houston, TX (US); Youlian Zhao, Foshan (CN); Yuan Li, Zhuzhou (CN)

( * ) Notice: Subject to any disclaimer, the term of this patent is extended or adjusted under 35 U.S.C. 154(b) by 0 days.

(21) Appl. No.: 17/579,432

(22) Filed: Jan. 19, 2022

(65) Prior Publication Data

US 2022/0232862 A1  Jul. 28, 2022

(30) Foreign Application Priority Data

Jan. 27, 2021 (AU) ................................ 2021100505

(51) Int. Cl.
| | |
|---|---|
| *A61K 35/74* | (2015.01) |
| *A23L 3/3571* | (2006.01) |
| *A23L 19/00* | (2016.01) |
| *A01N 63/20* | (2020.01) |
| *A23C 9/127* | (2006.01) |

(52) U.S. Cl.
CPC ............ *A23L 3/3571* (2013.01); *A01N 63/20* (2020.01); *A23C 9/127* (2013.01); *A23L 19/00* (2016.08); *A23V 2002/00* (2013.01)

(58) Field of Classification Search
CPC ....... A23L 3/3571; A23L 19/00; A01N 63/20; A23C 9/127; A23V 2002/00
USPC ........................................................ 426/34
See application file for complete search history.

(56) References Cited

FOREIGN PATENT DOCUMENTS

| BR | 102013015842 A2 | * | 10/2015 | ............. A23C 9/127 |
| CN | 102524387 B | * | 11/2013 | |
| CN | 109938114 A | * | 6/2019 | |

OTHER PUBLICATIONS

Translation of CN-102524387-B (Year: 2013).*
Translation of CN-109938114-A (Year: 2019).*
Translation of BR-102013015842-A2 (Year: 2015).*

* cited by examiner

*Primary Examiner* — Brent T O'Hern
(74) *Attorney, Agent, or Firm* — NZ Carr Law Office

(57) ABSTRACT

The present disclosure relates to a method for preparing an antimicrobial complex strain from kefir, which includes: 1) providing and, optionally filtering, kefir or kefir whey; 2) introducing a fermentable sugar into the kefir or kefir whey, wherein based on the weight of the kefir or kefir whey, at least a saturation amount of said fermentable sugar is used, and allowing curd to gather at the top, so as to form a pre-fermentation composition; and 3) enabling the pre-fermentation composition to ferment until a microbial membrane that is capable of growth develops at the top and a whey liquid forms underneath, and the whey liquid demonstrates antimicrobial activity and has a pH of about 3.0, wherein during the fermentation, if needed, further adding said kefir or kefir whey and/or said fermentable sugar.

5 Claims, 4 Drawing Sheets

METHOD FOR PREPARING AN ANTIMICROBIAL COMPLEX STRAIN FROM KEFIR

TECHNICAL FIELD

The present disclosure relates to a method for preparing an antimicrobial complex strain from kefir. Particularly, the present disclosure relates to a method for preparing an antibacterial, antifungal and/or antiviral complex strain from kefir.

BACKGROUND

The word "kefir" derives from the Turkish language and implies a pleasant taste. Kefir is a fermented drink native to the Caucasus region, which has a texture like thin yogurt and is lightly foamy. Kefir is usually produced by inoculating and fermenting animal milk such as cow milk or goat milk using kefir grains (or starters). Moreover, kefir produced from soy milk has been reported.

Kefir grains are mesophilic symbiotic cultures that can promote human health, among which various microorganisms become natural symbiotic organisms. Specifically, kefir grains contain various microorganisms such as *Lactobacillus* and Acetic acid bacteria, as well as lactose fermenting yeast (e.g. *Kluyveromyces marxianus*) and non-lactose fermenting yeasts (e.g. *Saccharomyces unisporus, Saccharomyces cerevisiae*, and *Saccharomyces exiguus*). It is worth mentioning that Tibetan mushroom is also called Tibetan kefir grain and is one family of kefir grains.

Attempts have been made to add food ingredient(s) into kefir to produce foods with even better health maintenance and promotion functions. For example, WO2002/076240 discloses a food product obtained by adding nattokinase to kefir. WO2010/021117 discloses an internal preparation for achieving beautiful skin which contains, as the active ingredient, milk serum kefir that is obtained by culturing milk serum, and can be in the form of a medicine, a food or a drink.

Furthermore, WO2018/079728 discloses application of an agent formed by including kefir as an active ingredient, for improving cancer treatment survival rates, in particular, chemotherapy and/or radiation-therapy survival rates. The agent is, for example, in the form of capsules, tablets, granules, powders, syrups, troches, sprays, emulsions, injections, suppositories, ointments, tapes, etc.

An antimicrobial substance is any substance of natural, semisynthetic or synthetic origin that kills or inhibits the growth of harmful microorganisms. Antimicrobial substances mainly include disinfectants (such as bleach), antiseptics, and antibiotics.

Generally, disinfectants, antiseptics, and antibiotics have slightly different applications. Disinfectants are non-selective and are normally applied to the surface of non-living objects to destroy microorganisms that are living on the objects, antiseptics destroy microorganisms on surfaces of living tissues, for example during surgery, and antibiotics destroy bacteria within a body. Furthermore, antifungals and antivirals are used to respectively target fungi and viruses within and outside a body.

A problem with antibiotics is that they indiscriminately destroy all the susceptible bacteria in an organism and/or microbiome, including both the "bad" bacteria they are targeting and the "good" bacteria that are required to keep the human and animal body healthy. Particularly, the good bacteria can support human and animal health by helping absorb nutrients, digest food, balance blood sugar, regulate the immune system, and balance emotions. Another problem is antibiotic resistance, which occurs when bacteria survive and continue causing infection despite treatment with an antibiotic.

What is currently desirable is an alternative that has less or no impact on the beneficial microorganisms within a living body while demonstrating inhibitory or killing activity against a wide range of harmful microorganisms. For this purpose, antimicrobial compositions prepared from natural materials have been attempted in the art. They are used in several industries such as personal care products, food applications, medicine and healthcare. For example, in personal care products, antimicrobials are used to help retard or eliminate the growth of topical pathogens as well as to preserve the personal care products from spoiling or to substantially improve the shelf-life of a product. US2016/0286820 A1 discloses an antimicrobial and antifungal composition for use in personal care products, which is prepared by macerating white fruit of *Cocos Nucifera* to create a feedstock material; mixing the feedstock material with a bacteria and using the bacteria to ferment the feedstock material to create a fermented product; and filtering the fermented product to clarify the product and remove remaining feedstock material, wherein the composition shows antibacterial and antifungal effectiveness when applied in the personal care products. Furthermore, AU 2019100035 discloses a method of preparing an antimicrobial strain composition from milk, a raw egg and a plant part.

However, there remains need for a simplified method for producing an antimicrobial complex strain, which can be used for further culture propagation, so as to provide a composition that has inhibitory or killing activity against a wide range of harmful microorganisms such as bacteria, fungi and/or viruses, but causes little or no damage to beneficial microorganisms on the host.

SUMMARY

In a first aspect, the present disclosure provides a method for preparing an antimicrobial complex strain from kefir, which includes:

1) providing and, optionally filtering, kefir or kefir whey;
2) introducing a fermentable sugar into the kefir or kefir whey, wherein based on the weight of the kefir or kefir whey, at least a saturation amount of said fermentable sugar is used, and allowing curd to gather at the top, so as to form a pre-fermentation composition; and
3) enabling the pre-fermentation composition to ferment until a microbial membrane that is capable of growth develops at the top and a whey liquid forms underneath, and the whey liquid demonstrates antimicrobial activity and has a pH of about 3.0, wherein during the fermentation, if needed, further adding said kefir or kefir whey and/or said fermentable sugar.

In some embodiments of the first aspect, kefir used in step 1) is obtained through a process including the following steps:

a) providing a dairy composition comprising kefir grains, milk and a fermentable sugar, wherein based on the weight of the milk, the kefir grains are used in an amount of about 0.5 wt % to 20 wt %, the fermentable sugar is used in at least a saturation amount; and
b) allowing the dairy composition to ferment so that it turns into a yogurt texture.

In a second aspect, the present disclosure provides an antimicrobial complex strain prepared by the method of the first aspect, which is characterised in that 1) a microbial membrane that is capable of growth can develop and/or the microbial membrane from the complex strain is able to grow therein upon further culture propagation, 2) it has inhibitory or killing activity against harmful microorganisms, 3) it is capable of fermenting organic substances, and 4) it is capable of fermenting until pH is about 3.0.

In a third aspect, the present disclosure provides a composition prepared from fermentation of grapes by the antimicrobial complex strain of the second aspect, wherein the fermentation is conducted with a composition comprising the antimicrobial complex strain or a whey liquid from the antimicrobial complex strain, a fermentable sugar, grapes and optionally water until a microbial membrane that is capable of growth develops and/or the microbial membrane from the antimicrobial complex strain continues to grow at the top and a liquid part forms underneath, and the liquid part demonstrates antimicrobial activity and has a pH of about 3.0.

In a fourth aspect, the present disclosure provides use of a composition of the third aspect in health care and food preservation.

DETAILED DESCRIPTION

The term "antimicrobial" in the present disclosure means being able to inhibit or kill microorganisms that are harmful to human and/or animal bodies, wherein the microorganisms include, but are not limited to, bacteria, fungi such as mould, and viruses. In some embodiments of the present disclosure, the microorganisms refer to infection-causing microorganisms. In some embodiments of the present disclosure, the microorganisms refer to mould, especially green mould and black mould. In the case of diabetes and diabetes complications, the microorganisms may include *Staphylococcus aureus, Enterococcus, Pseudomonas aeruginosa, Escherichia coli, Klebsiella species*, and *Proteus* species. In the case of eczema, the microorganisms may include herpes viruses and *Staphylococcus aureus.*

The term "complex strain" in the present disclosure means a product which contains a plurality of individual microbial strains and wherein the individual strains will act in a synergic manner. The complex strain of the present disclosure can be used for further culture propagation.

Figure 1:
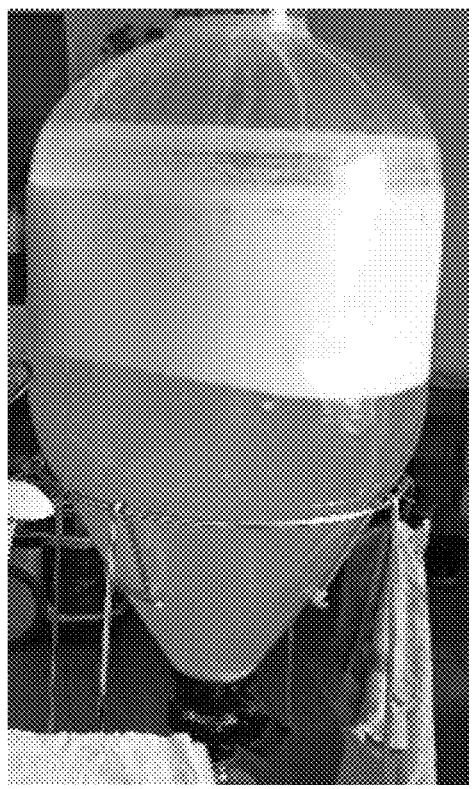
FIG. 1 shows a pre-fermentation composition obtained through step 2) of the method of the first aspect, wherein curd gathers at the top.
Figure 2:
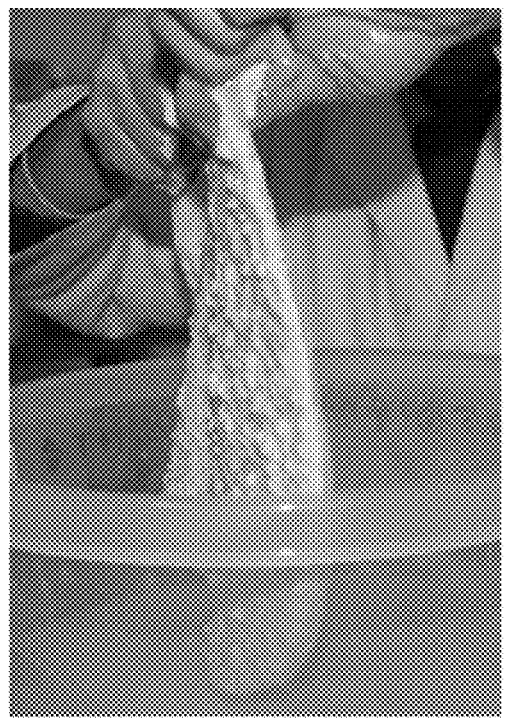
FIG. 2 shows a microbial membrane (or block) capable of growth that is formed through the method of the first aspect.
Figure 3:
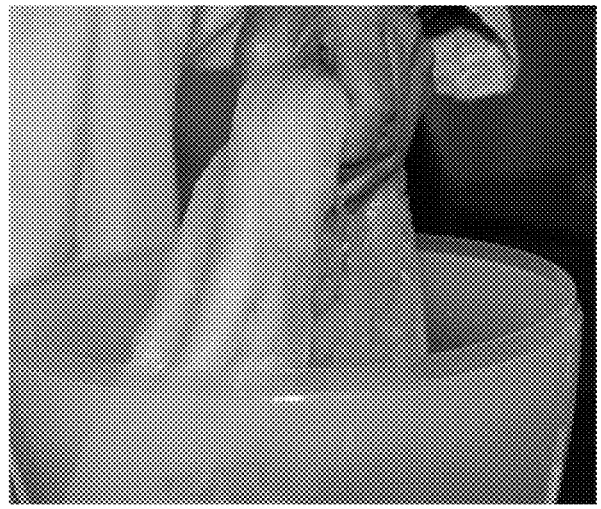
FIG. 3 shows a composition prepared from fermentation of grapes in the antimicrobial complex strain of the second aspect.

The phrase "a microbial membrane that is capable of growth" used herein indicates that the microbial membrane is capable of growing in thickness and forming a soft block, for example, as shown in FIG. 2. The soft block is normally of while colour, smooth and glossy.

In a first aspect, the present disclosure provides a method for preparing an antimicrobial complex strain from kefir, which includes:

1) providing and, optionally filtering, kefir or kefir whey;
2) introducing a fermentable sugar into the kefir or kefir whey, wherein based on the weight of the kefir or kefir whey, at least a saturation amount of said fermentable sugar is used, and allowing curd to gather at the top, so as to form a pre-fermentation composition; and
3) enabling the pre-fermentation composition to ferment until a microbial membrane that is capable of growth develops at the top and a whey liquid forms underneath, and the whey liquid demonstrates antimicrobial activity and has a pH of about 3.0, wherein during the fermentation, if needed, further adding said kefir or kefir whey and/or said fermentable sugar.

The term "kefir" in the present disclosure refers to a yogurt product that is produced by fermenting milk using kefir grains and which is slightly foamy. The kefir is commercially available, for example, from Lifeway Foods, Inc. of Israel, or can be produced though a method described herein below. Kefir grains are small irregular shaped crumbs, have an ivory or white color, and are gelatinous. The kefir grains are commercially available, for example from NourishmeOrganics, Australia. In some embodiments, the kefir grains can originate from Tibetan mushroom.

The term "milk" in the present disclosure can be selected from plant-based milk, animal milk, and combinations thereof. The plant-based milk includes, but not limited to, soy milk, almond milk, coconut milk, and combinations thereof. The animal milk includes, but not limited to, cow milk, goat milk, sheep milk, and combinations thereof. Furthermore, the milk can be processed or unprocessed. In some embodiments, the milk is preferably selected from animal milk. In some embodiments, the milk can be commercially available, for example, milk sold under the trade mark PURA®.

As stated in step 1), if needed, particles above about 0.2 mm are filtered out of the kefir provided. A screen of 60 mesh to 70 mesh can be used for this purpose.

The phrase "fermentable sugar" in the present disclosure means a sugar that readily participates in the fermentation of milk. The fermentable sugars may include, but not limited to, glucose, fructose, sucrose, maltose, galactose, raffinose and combinations thereof. In some embodiments, the sucrose to be used can originate from for example, but not limited to, cane sugar and beet sugar.

In step 2), based on the weight of the kefir or kefir whey, the fermentable sugar is used in at least a saturation amount. Specifically, if sucrose is used as said fermentable sugar, its amount at about 20° C. can be at least about 20 wt % based on the weight of the kefir or kefir whey.

In some embodiments, in step 2), after introducing the fermentable sugar into the kefir whey, the kefir whey and the fermentable sugar are left rest whilst allowing curd to gather at the top, so as to form the pre-fermentation composition. In some other embodiments, in step 2), after introducing the fermentable sugar into the kefir, the kefir and the fermentable sugar are evenly mixed, for example through stirring, then left rest whilst allowing curd to gather at the top, so as to form the pre-fermentation composition.

The fermentation in step 3) can be carried out under closed conditions. The phrase "closed conditions" in the present disclosure means that, during fermentation, the container with materials to be fermented is enclosed but has some air exchange with surrounding environment. It is suggested that under normal pressure, the fermentation temperature is no less than about 16° C. and no more than about 35° C. Preferably, the fermentation is carried out at about 18° C. to about 28° C., for example, about 18° C., about 19° C., about 20° C., about 21° C., about 22° C., about 23° C., about 24° C., about 25° C., about 26° C., about 27° C., or about 28° C. More preferably, the fermentation is carried out at about 22° C. When the fermentation temperature is less than about 16° C., it may take longer time to achieve desirable fermentation. The exact amount of fermentation time may vary depending on environmental factors and can be for example about one day to about 20 days.

For step 3), the pre-fermentation composition is fermented until a microbial membrane that is capable of growth develops at the top and a whey liquid forms underneath, and the whey liquid demonstrates antimicrobial activity and has a pH of about 3.0. During the fermentation, if needed, further adding said kefir or kefir whey and/or said fermentable sugar, which is intended to enable the microbial membrane to grow and thicken. Intense release of gas can be observed during said fermentation. Furthermore, a relatively strong acid condition is favourable for the fermentation of step 3).

The antimicrobial complex strain prepared by the method of the first aspect is characterised in 1) a microbial membrane that is capable of growth can develop and/or the microbial membrane from the complex strain is able to grow therein upon further culture propagation, 2) it has inhibitory or killing activity against harmful microorganisms, 3) it is capable of fermenting organic substances, and 4) it is capable of fermenting until pH is about 3.0. It is worth mentioning that both said whey liquid and said microbial membrane (or a microbial block resulted from growth of said microbial membrane) are able to inhibit or kill harmful microorganisms.

The term "antimicrobial" in the present disclosure intends to be associated with organic substances and means the killing or inhibitory activity against harmful microorganisms, for example mould (including green mould and black mould). It is important to examine if said whey liquid has antimicrobial activity, which can be readily measured through the method described hereinafter. The organic substances include, but not limited to, various food such as water, yogurt and fruits.

In some embodiments of the first aspect, kefir used in step 1) is obtained through a process including the following steps:
a) providing a dairy composition comprising kefir grains, milk and a fermentable sugar, wherein based on the weight of the milk, the kefir grains are used in an amount of about 0.5 wt % to 20 wt %, the fermentable sugar is used in at least a saturation amount; and
b) allowing the dairy composition to ferment so that it turns into a yogurt texture.

Kefir grains used in step a) are commercially available online, for example though NourishmeOrganics, Australia. Tibetan mushroom can also be used as said kefir grains.

For step a), the fermentable sugar is used in at least a saturation amount based on the weight of the milk. Specifically, if sucrose is used as said fermentable sugar, its amount at about 20° C. can be at least about 20 wt % based on the weight of the milk. For step a), the kefir grains are used in an amount of about 0.5 wt % to 20 wt %, for example, about 10 wt % to 20 wt %, based on the weight of the milk. Normally, a higher amount of kefir grains may lead to a faster fermentation in step b).

The dairy composition of step a) can be mixed evenly, for example through stirring before fermentation.

The fermentation in step b) can be carried out under closed conditions. As stated above, "closed conditions" in the present disclosure means that, during the fermentation, the container with materials to be fermented is enclosed but has some air exchange with surrounding environment. It is suggested that under normal pressure, the fermentation temperature is no less than about 16° C. and no more than about 35° C. Preferably, the fermentation is carried out at about 18° C. to about 28° C., for example, about 18° C., about 19° C., about 20° C., about 21° C., about 22° C., about 23° C., about 24° C., about 25° C., about 26° C., about 27° C., or about 28° C. More preferably, the fermentation is carried out at about 22° C. When the fermentation temperature is less than about 16° C., it may take longer time to achieve desirable fermentation. The exact amount of fermentation time may vary depending on environmental factors and can be for example about 8 hours to several days.

The method for testing antimicrobial activity includes taking an amount of the whey liquid of the complex strain or an amount of the liquid part of its derivative product to cover the surface of a substrate, and placing the whey liquid or the liquid part of its derivative product and the substrate under room temperature and open conditions for a period to observe if harmful microorganisms such as mould grow out. The derivative product mentioned here means a product that is made from further culture propagation of said antimicrobial complex strain.

The antimicrobial activity test is used to determine if said antimicrobial complex strain or its derivative product has inhibitory or killing activity against harmful microorganisms such as mould. Various substrates such as yogurt can be used to conduct the test. Specifically, several identical containers with a certain amount of yogurt are prepared, and then a layer of the substance to be tested is spread to cover the surface of the yogurt, wherein the thickness of the substance to be tested can be for example about 0.5 to 1 cm. The substance to be tested may include the whey liquid obtained from step 3) in the method of the first aspect. In addition, a control experiment can be carried out. The control substance to be tested can include, for example, water. All the samples are then placed under open conditions at room temperature. With the progress of evaporation, mould together with other harmful microorganisms may grow out. If, after a period of time, there is no growth of mould together with other harmful microorganisms for a container with the substance to be tested while there is growth of mould together with other harmful microorganisms for a container with the control substance, it is preliminarily believed that the substance to be tested has antimicrobial activity. Furthermore, it is possible to evaluate the antimicrobial activity of the substance to be tested according to the speed of growth of mould or other harmful microorganisms and/or the sizes and number of microorganism spots.

In a second aspect, the present disclosure provides an antimicrobial complex strain prepared by the method of the first aspect, which is characterised in 1) a microbial membrane that is capable of growth can develop and/or the microbial membrane from the complex strain is able to grow therein upon further culture propagation, 2) it has inhibitory or killing activity against harmful microorganisms, 3) it is capable of fermenting organic substances, and 4) it is capable of fermenting until pH is about 3.0. It is worth mentioning that both said whey liquid and said microbial membrane (or a microbial block resulted from growth of said microbial membrane) are able to inhibit or kill harmful microorganisms.

In a third aspect, the present disclosure provides a composition prepared from fermentation of grapes by the antimicrobial complex strain of the second aspect, wherein the fermentation is conducted with a composition comprising the antimicrobial complex strain or a whey liquid from the antimicrobial complex strain, a fermentable sugar, grapes and optionally water until a microbial membrane that is capable of growth develops an/or the microbial membrane from the complex strain continues to grow at the top and a liquid part forms underneath, and the liquid part demonstrates antimicrobial activity and has a pH of about 3.0. In some embodiments, in the case of fermenting grapes with the antimicrobial complex strain, if there is stirring during fermentation a new microbial membrane will develop, while if no stirring occurs during fermentation the microbial membrane from the complex strain will continue to grow.

In relation to the third aspect, the antimicrobial complex strain of the second aspect is used to ferment grapes, so as to provide a composition that has inhibitory or killing activity against a wide range of harmful microorganisms such as bacteria, fungi and/or viruses, but causes little or no damage to the beneficial microorganisms on the host. The grapes can be grapes originated from such varieties as Shiraz, Cabernet Sauvignon, Riesling, Chardonnay, Pinot Noir. The fermentation can be performed under closed conditions. It is suggested that under normal pressure, the fermentation temperature is no less than about 16° C. and no more than about 35° C. Preferably, the fermentation is carried out at about 18° C. to about 28° C., for example, about 18° C., about 19° C., about 20° C., about 21° C., about 22° C., about 23° C., about 24° C., about 25° C., about 26° C., about 27° C., or about 28° C. More preferably, the fermentation is carried out at about 22° C. When the fermentation temperature is less than about 16° C., it may take longer time to achieve desirable fermentation. The exact amount of fermentation time may vary depending on environmental factors and can be for example about one day to about 20 days. In some embodiments, the fermentation is conducted with a composition consisting of a whey liquid from the antimicrobial complex strain, a fermentable sugar, water and grapes. In some embodiments, the fermentation can be carried out with a whey liquid from the antimicrobial complex strain and water containing a fermentable sugar in a ratio of about 1:1 by weight as well as an amount of grapes. The fermentable sugar is used in at least a saturation amount relative to liquid components. The amount of grapes may be chosen in accordance with the fermenter to be used. When the pulp of grapes in the fermenter has been consumed during fermentation, new grapes should be added to replace grapes previously present in the fermenter. The composition of the third aspect obtained thereby can serve as a starting strain for long-term propagation.

In a fourth aspect, the present disclosure provides the use of the composition of the third aspect in health care and food preservation. It is believed that the components in the composition of the third aspect have synergistic effects, can significantly promote the internal metabolism, and maintain beneficial microflora in the intestines, and thus can be called a "LEV", which stands for Live, Energy and Vitality. In some embodiments, the composition can be used to alleviate or improve symptoms, for example, ovarian cancer, type II diabetes and complications, as well as eczema and skin scars.

EXAMPLES

Example 1—Preparation of an Antimicrobial Complex Strain

Figure 4:
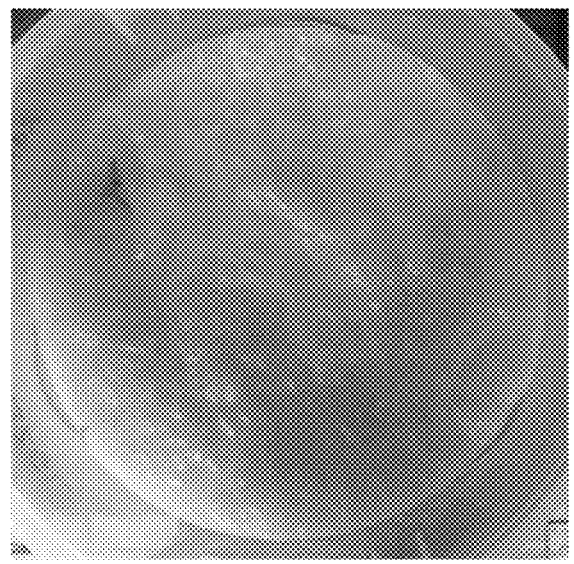
FIG. 4 shows an antimicrobial complex strain obtained through Example 1 of the present disclosure, wherein the microbial membrane (or block) is formed at the top.

2 L PURA® original milk, 400 g sucrose and 100 g kefir grains are added into 3 L fermenter, so as to provide a dairy composition. The dairy composition is then fermented at room temperature under closed conditions for about 12 hours until it turns into a yogurt texture and thus kefir is obtained. The kefir is filtered through a 70-mesh screen. Then 500 g sucrose is added into the kefir, and evenly stirred, then left to rest whilst allowing curd to gather at the top, so as to form a pre-fermentation composition. The pre-fermentation composition is fermented at room temperature under closed conditions for about 12 days, wherein a microbial membrane that is capable of growth develops at the top and a whey liquid forms underneath, and the whey liquid demonstrates antimicrobial activity and has a pH of about 3.0. FIG. 4 shows the antimicrobial complex strain prepared, wherein the microbial membrane (or block) is located at the top.

Example 2—a Composition Obtained from Fermentation/Propagation of the Antimicrobial Complex Strain of Example 1

A composition was prepared through further fermentation of grapes within whey liquid of the complex strain obtained from Example 1. The fermentation was conducted as follows: introducing 500 g of the whey liquid obtained from Example 1, 500 g water, 200 g sucrose and 100 g grapes into a fermenter so as to form a mixture, and allowing the mixture to ferment under closed conditions at room temperature until a microbial membrane that is capable of growth develops at the top and a liquid part forms underneath, and the liquid part demonstrates antimicrobial activity and has a pH of about 3.0.

Example 3—Effects of the Composition Obtained Through Example 2 on Cell Proliferation of MAGI-CCR5

The MTT (3-(4,5-dimethylthiazol-2-yl)-2,5-diphenyl tetrazolium bromide) assay was used to evaluate effects of the composition obtained through Example 2 on cell proliferation of MAGI-CCR5. The composition was centrifuged, then the precipitates were removed, and the supernatant was taken and filtered with a 0.22 μm filter to produce a stock solution.

Figure 5:
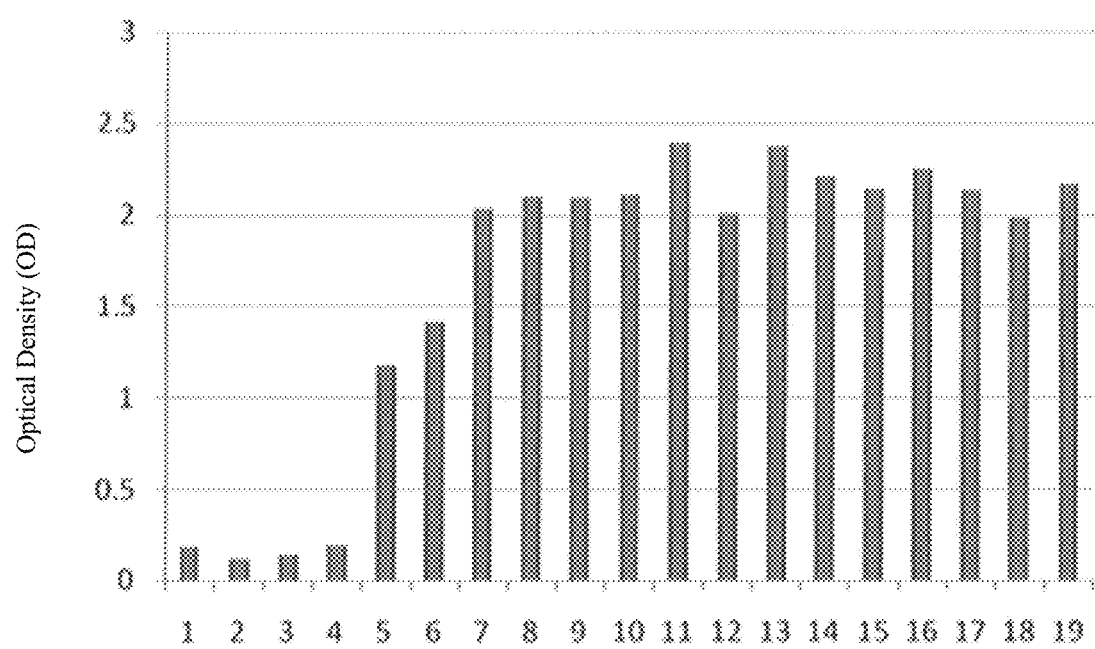
FIG. 5 shows optical density (OD) of each of the stock solution and the solutions diluted at different concentrations after intervention of MAGI-CCR5 cells, wherein 1-18 respectively corresponds to samples from the stock solution across to the stock solution diluted at 1/131072 times, 19 corresponds to the blank control.
Figure 6:
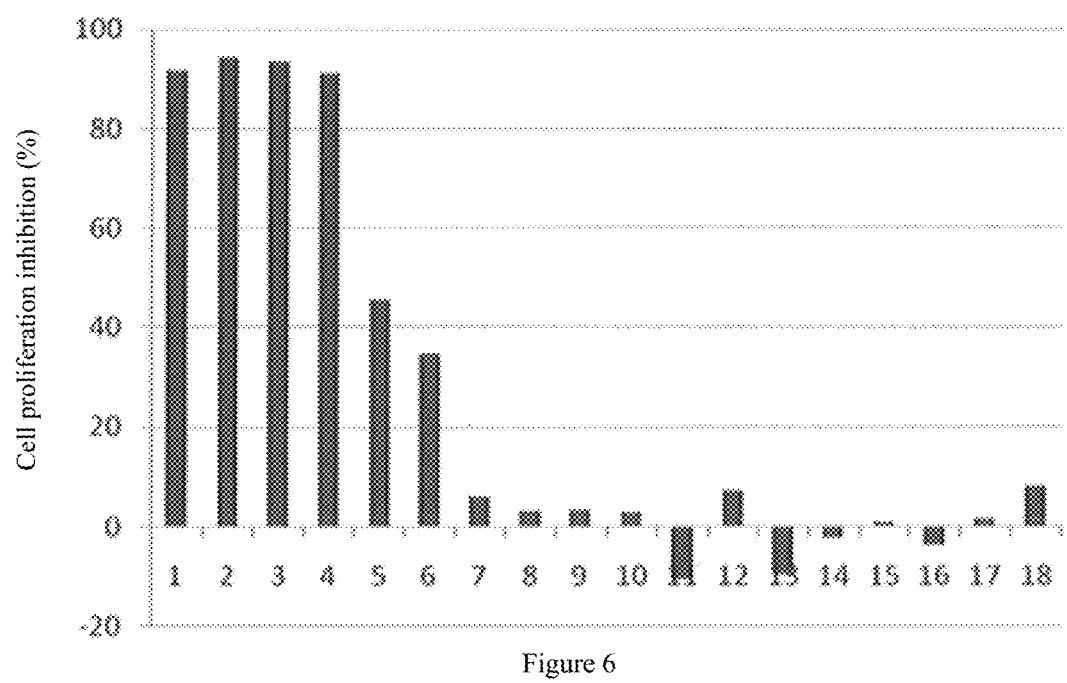
FIG. 6 shows cell proliferation inhibition (%) of MAGI-CCR5 cells by each of the stock solution and the solutions diluted at different concentrations, wherein 1-18 respectively corresponds to samples from the stock solution across to the stock solution diluted at 1/131072 times.

The stock solution underwent 2 fold serial dilutions to 1/131072 with a complete medium and the following samples were obtained: the stock solution, 1/2 the stock solution, 1/4 the stock solution, 1/8 the stock solution, 1/16 the stock solution, 1/32 the stock solution, 1/64 the stock solution, 1/128 the stock solution, 1/256 the stock solution, 1/512 the stock solution, 1/1024 the stock solution, 1/2048 the stock solution, 1/4096 the stock solution, 1/8192 the stock solution, 1/16384 the stock solution, 1/32768 the stock solution, 1/65536 the stock solution, 1/131072 the stock solution. Cell proliferation inhibition=(OD value of the blank control–OD value of a sample/OD value of the blank control)×100%, wherein the OD value stands for optical density. After an intervention of 24 hours, the stock solution, 1/2 the stock solution, 1/4 the stock solution and 1/8 the stock solution show a very good cell proliferation inhibition of MAGI-CCR5 that is above 90%; 1/16 the stock solution and 1/32 the stock solution show an apparent cell proliferation inhibition of MAGI-CCR5; 1/64 the stock solution and the other samples demonstrate no significant cell proliferation inhibition of MAGI-CCR5. The results are set out in Table 1 and FIGS. 5-6.

TABLE 1 cytotoxicity (%) of the stock solution and the solutions diluted at different concentrations on MAGI-CCR5 cells

| Sample | OD value | Proliferation prohibition (%) |
| --- | --- | --- |
| the stock solution | 0.18 ± 0.01 | 91.54 |
| 1/2 the stock solution | 0.12 ± 0.01 | 94.43 |
| 1/4 the stock solution | 0.14 ± 0.00 | 93.46 |
| 1/8 the stock solution | 0.19 ± 0.03 | 91.22 |
| 1/16 the stock solution | 1.18 ± 0.08 | 45.53 |
| 1/32 the stock solution | 1.42 ± 0.05 | 34.60 |
| 1/64 the stock solution | 2.03 ± 0.50 | 6.19 |
| 1/128 the stock solution | 2.10 ± 0.43 | 3.03 |
| 1/256 the stock solution | 2.09 ± 0.20 | 3.36 |
| 1/512 the stock solution | 2.10 ± 0.19 | 2.88 |
| 1/1024 the stock solution | 2.39 ± 0.16 | −10.46 |
| 1/2048 the stock solution | 2.01 ± 0.03 | 7.26 |
| 1/4096 the stock solution | 2.37 ± 0.28 | −9.61 |
| 1/8192 the stock solution | 2.21 ± 0.12 | −2.07 |
| 1/16384 the stock solution | 2.14 ± 0.20 | 1.04 |
| 1/32768 the stock solution | 2.24 ± 0.32 | −3.68 |
| 1/65536 the stock solution | 2.13 ± 0.06 | 1.63 |
| 1/131072 the stock solution | 1.98 ± 0.02 | 8.33 |
| the blank control | 2.16 ± 0.13 | |

Although embodiment(s) of the present invention have been described in the foregoing detailed description, it will be understood that the invention is not limited to the embodiment(s) disclosed, but is capable of numerous rearrangements, modifications and substitutions without departing from the scope of the invention.

Throughout this specification, the word "comprise", or variations such as "comprises" or "comprising", will be understood to imply the inclusion of a stated element, integer or step, or group of elements, integers or steps, but not the exclusion of any other element, integer or step, or group of elements, integers or steps.

All publications mentioned in this specification are herein incorporated by reference. Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed in Australia or elsewhere before the priority date of each claim of this application.

The invention claimed is:

1. An antimicrobial complex strain, prepared by a method comprising:
   preparing an antimicrobial complex strain from kefir, which includes:
   1) providing and, optionally filtering, kefir or kefir whey;
   2) introducing a fermentable sugar into the kefir or kefir whey, wherein based on the weight of the kefir or kefir whey, at least a saturation amount of said fermentable sugar is used, and allowing curd to gather at a top portion, so as to form a pre-fermentation composition; and
   3) enabling the pre-fermentation composition to ferment until a microbial membrane that is capable of growth develops at the top portion and a whey liquid forms underneath the microbial membrane, and the whey liquid demonstrates antimicrobial activity and has a pH of about 3.0, wherein during fermentation, if needed, further adding said kefir or kefir whey and/or said fermentable sugar;
   which is characterised in 1) a microbial membrane that is capable of growth can develop 2) it has inhibitory or killing activity against harmful microorganisms, 3) it is capable of fermenting organic substances, and 4) it is capable of fermenting until pH is about 3.0.

2. The antimicrobial complex strain of claim 1, wherein the kefir in the providing and, optionally filtering, kefir or kefir whey is obtained through a process including the following steps:
   a) providing a dairy composition comprising kefir grains, milk and a fermentable sugar, wherein the kefir grains are used in an amount of about 0.5 wt % to 20 wt % of a weight of the milk, the fermentable sugar is used in at least a saturation amount; and
   b) allowing the dairy composition to ferment so that it turns into a curd.

3. A composition prepared from fermentation of grapes in the antimicrobial complex strain according to claim 1, wherein the fermentation is conducted with a composition comprising the antimicrobial complex strain or a whey liquid from the antimicrobial complex strain, a fermentable sugar, grapes and optionally water until a microbial membrane that is capable of growth develops and/or the microbial membrane from the antimicrobial complex strain continues to grow at the top portion and a liquid part forms underneath, and the liquid part demonstrates antimicrobial activity and has a pH of about 3.0.

4. The composition prepared from fermentation of grapes in the antimicrobial complex strain of claim 3, wherein the kefir in the providing and, optionally filtering, kefir or kefir whey is obtained through a process including the following steps:
   a) providing a dairy composition comprising kefir grains, milk and a fermentable sugar, wherein based on a weight of the milk, the kefir grains are used in an amount of about 0.5 wt % to 20 wt % of the milk, the fermentable sugar is used in at least a saturation amount; and
   b) allowing the dairy composition to ferment so that it turns into a curd.

5. The antimicrobial complex strain of claim 1, wherein the microbial membrane from the complex strain is able to grow continuously during fermentation.

* * * * *